March 22, 1966   J. P. DANFORTH ETAL   3,242,338
METHOD FOR WEAR TESTING
Filed Nov. 3, 1958

INVENTORS
John P. Danforth &
BY Farno L. Green

Warren D. Hill
ATTORNEY

3,242,338
METHOD FOR WEAR TESTING
John P. Danforth, Mount Clemens, and Farno L. Green,
Warren, Mich., assignors to General Motors Corporation, Detroit, Mich., a corporation of Delaware
Filed Nov. 3, 1958, Ser. No. 771,249
2 Claims. (Cl. 250—106)

This invention relates to an improved method for wear testing by the use of radioactive isotopes.

It is well known and has become common practice to test for wear by incorporating into the test piece a radioactive isotope, subjecting the test piece to wear conditions and then detecting the amount of radioactivity in the wear debris. For example, an automobile engine piston ring can be irradiated or formulated so that one of its constituent metals is a radioactive isotope, run in an engine, and the amount of wear determined by measuring the radioactivity of the engine lubricating oil which carries away the wear debris. The particular advantage to this technique is that it can be used to provide a relatively accurate indication of wear characteristics in a short time as compared to the time required by older methods wherein the part would be subjected to wear conditions until there was sufficient wear to be accurately detected by analysis, weighing or other conventional physical measurement. However, the radioisotope method has the serious disadvantage of requiring extremely close control and extensive safety precautions against radiation hazard. In practice a relatively long half-life radioactive material must be utilized, and thus, the entire test site, the lubricating oil, plus the parts it contacts are subject to relatively long-lived contamination.

It is one of the objects of the present invention to provide a wear test method which is highly sensitive, rapid and yet which substantially eliminates the radiation hazard. More specifically, an object of the invention is the provision of a wear test method wherein the test is accomplished by the utilization of radioisotope means but without the radiation hazard normally associated with such means. These and other objects and advantages are accomplished in accordance with the invention by forming the test piece to include an insert, on its wearing surface, of an indicator material which may be transformed into a radioactive isotope by subjecting it to a suitable source of radiation. The test piece with the indicator material insert is subjected to the wear test and the wear debris collected by means of the circulated lubricating oil. After the desired period of testing or at any number of spaced intervals, a sample or samples of the fear debris are collected and subjected to radiation which selectively transforms the indicator material to a radioisotope. After such irradiation is completed, the radiation from the sample is counted by means of a conventional radiation detector, the count obtained being an accurate measurement of the indicator material contained in the sample and, therefore, of the amount of wear of the test piece.

The requirements for the indicator material are as follows:

(1) It must have a suitable nuclear cross-section such that it can be converted by irradiation into a radioisotope having radiation characteristics readily distinguishable from those of any other isotope that might result from any other constituent of wear debris by way of the irradiation. Preferably, it should be such that by way of suitable irradiation it can be selectively converted to a short-lived radioisotope. For ease of detection, the indicator material should best exhibit, upon irradiation, radioactivity with a short half-life strong gamma. The detection of gamma activity is preferable to the detection of beta activity because of the discrete energy levels associated with gamma activity which lend themselves to accurate identification. In order to obtain the benefits of gamma detection it may be necessary to employ an indicator material having a fairly long half-life neutron activated isotope. If this isotope has a distinctive gamma energy, it may be selectively detected by use of a gamma spectrometer.

(2) Its wear characteristics must be such that the insert wears at substantially the same rate as does the test piece. Also, it must not cause abnormal wear or scoring of the test piece.

(3) It must be distinct from all other materials which are subject to wear in the system being tested. That is, the indicator insert cannot be of a material which is the same as that of any other part or component, the wear debris of which will become intermixed with that of the insert.

(4) It should be substantially chemically inert with respect to all other materials, such as the lubricating oil, present in the system.

(5) Its physical characteristics should be such that it can be applied as an insert to the test piece as by mechanical insertion, casting, molding, welding, electrodeposition or chemical deposition. In this same connection, it should be easily machinable or otherwise adapted to accurate forming so that the exposed surface of the insert can be accurately shaped as required.

From the standpoint of nuclear cross-section, any of the following elements will serve satisfactorily as the indicator insert material: aluminum, antimony, arsenic, barium, bismuth, bromide, cadmium, calcium, cerium, cesium, chlorine, chromium, cobalt, copper, dysprosium, erbium, europium, gadolinium, gallium, germanium, gold, hafnium, holmium, indium, iodine, iridium, iron, lanthanum, lutecium, magnesium, maganese, mercury, molybdenum, neodymium, nickel, niobium, osmium, palladium, phosphorus, platinum, potassium, praseodymium, rhenium, rhodium, rubidium, ruthenium, samarium, scandium, selenium, silicon, silver, sodium, strontium, sulfur, tantalum, tellurium, terbium, thallium, thorium, thulium, tin, titanium, tungsten, uranium, vanadium, ytterbium, yttrium, zinc, and zirconium. With respect to the other required characteristics, the choice of indicator insert material will, of course, depend on the precise system or device in which the test is to be made. Where a material otherwise meets the requirements except that it does not have the desired wear characteristics or does not have sufficient formability, it may be used in comminuted form or as one of its salts or other compounds in uniform admixture with a suitable inert plastic binder to provide the desired degree of softness and ductility.

The method of invention will be more fully understood from the following description of an embodiment thereof taken in conjunction with the accompanying drawings wherein like reference numerals refer to like parts and wherein.

Figure 1:
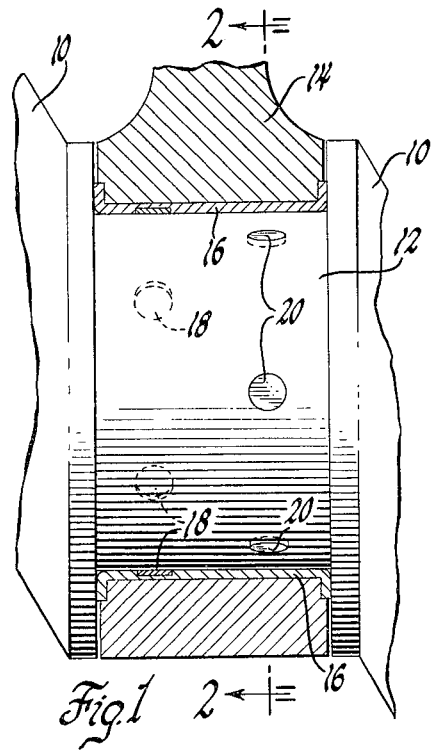
FIGURE 1 is a cross-sectional view of a bearing assembly illustrating the inserts in a bearing prepared for a wear test according to our invention.
Figure 2:
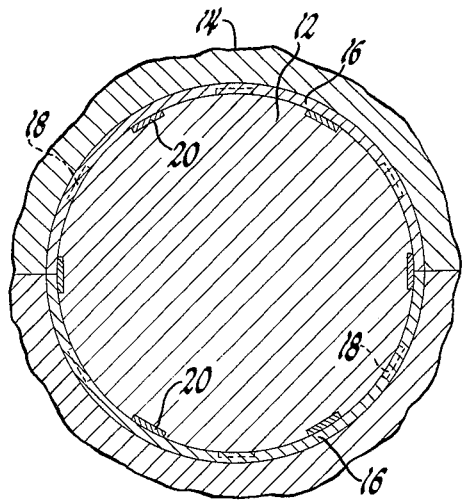
FIGURE 2 is a cross-sectional view taken along lines 2—2 of FIGURE 1.
Figure 3:
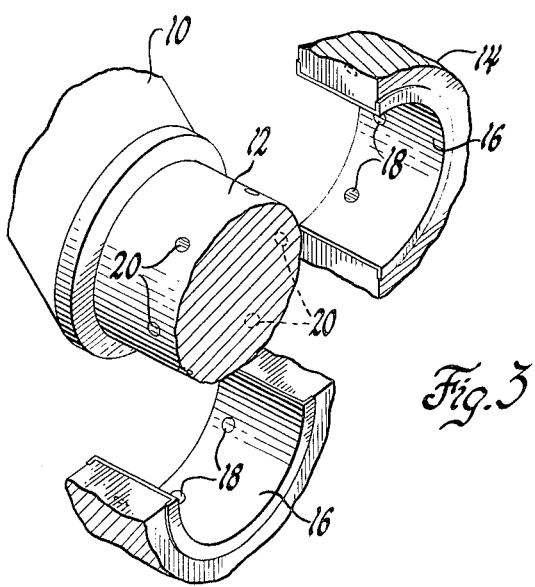
FIGURE 3 is a partly broken away exploded view of the bearing assembly of FIGURE 1.

In the drawings, a crankshaft bearing assembly includes a portion of a crankshaft 10 having a shaft-like bearing portion 12 surrounded by a connecting rod 14 having a steel bearing liner 16. These parts are conventional except for the inclusion of several aluminum inserts 18 of circular cross-section spaced around the bearing liner 16 and a similar series of inserts 20 of a different material spaced around the crankshaft bearing surface 12. The inserts of each series are shown as being aligned in a plane perpendicular to the axis of the bearing but, if desired, the inserts may be staggered over the bearing surface to provide a more representative sampling of bearing surface wear. Each insert is carefully machined so that its surface exactly conforms to the surface of the part in which it is located so that when wear of the part occurs, exactly the same amount of wear of the insert will occur.

In the development of new or improved engine designs, it is frequently required that accurate information be obtained on the precise wear characteristics of a specific area of a steel bearing 16. In accordance with the present invention a portion of this selected area is machined away to form an indentation as, for example, in the form of a circular slot, and the indentation filled with an insert 18 of the indicator material, for example aluminum, care being taken to accurately shape the exposed surface of the insert 18. The engine is then assembled and run under the desired test conditions, all the wear debris being carried away from the wearing parts by way of the circulating lubricating oil. Even though the insert material is relatively soft, it wears at the same rate as those portions of the bearing surface 16 which bound it. At spaced intervals during the test run of the engine, lubricating oil samples carrying the total wear debris may be taken and stored until completion of the entire test run. Each sample is then irradiated and immediately after irradiation, is counted by a radiation detector to measure the amount of induced radioisotope present. Irradiation may be by way of neutron bombardment in a nuclear reactor or from a neutron source such as a portable polonium-beryllium source, or from any of the well-known particle accelerators such as a cyclotron or Van de Graaff machine. The following data and calculations with respect to a specific embodiment of the invention to determine bearing wear will serve to further illustrate the method:

(1) Wear test on a six cylinder 425 cubic inch displacement diesel engine connecting rod crankshaft bearing.
Bearing inside diameter, 2.754 inches.
Bearing width, $1\tfrac{25}{32}$ inches.
Engine lubricating system capacity, 24 quarts.
Indicator material, aluminum.
Indicator area, six ¼-inch diameter circular inserts, approximately 2 percent of bearing wear surface.
Detection system, a counter with a $4\pi$ geometry deep well thallium activated sodium iodide crystal scintillation detector. (Sample is placed inside a cylindrical hole in the crystal enabling the crystal to capture radiation emitted from the sample throughout a $4\pi$ solid angle minus the solid angle of the hole itself.)
Detector efficiency 90 percent, i.e., 100 disintegrations per second yield 90 counts per second.
Oil sample volume 5 cc.

(2) After the test run of the engine oil sample subjected to irradiation in a nuclear reactor flux of $1\times 10^{13}$ neutrons cm.$^{-2}$ sec.$^{-1}$ for 6.9 minutes.

(3) Count rate of the 5 cc. lubricating oil sample measured after irradiation and corrected for background radiation level to determine the net count rate from sample.

| | Counts/minute |
|---|---|
| Measured count rate | 2500 |
| Background count rate | 400 |
| Net count rate | 2100 |

(4) Determine radioactive disintegration rate A, expressed in disintegrations per second.

$$A = \frac{\text{net count rate}}{\text{counting efficiency}} = \frac{2100 \text{ counts/min.}}{\frac{0.90 \text{ counts/min.}}{1.00 \text{ disintegrations/min.}}} \times \frac{60 \text{ sec.}}{\text{min.}}$$

$$A = \frac{2100}{0.90 \times 60} d/\text{sec.} = 38.9 \frac{\text{disintegrations}}{\text{sec.}}$$

(5) Relate disintegration rate to number of indicator atoms in sample by computing activity induced during activation of sample:

Relation:

$$A = F\sigma N I_a \left[1 - e^{\frac{-0.693 t_i}{T_{1/2}}}\right]$$

where
$A$ = radioactive disintegrations/second = 38.9.
$F = 1 \times 10^{13}$ $n$/cm.$^2$/sec.
$\sigma$ = nuclear cross section of target nuclide expressed in barns or $10^{-24}$ sq. cm. $\sigma_{AL} = 0.23 \times 10^{-24}$ cm.$^2$.
$N$ = number of target atoms.
$I_a$ = isotopic abundance of target nuclide = 100% = 1.00.
$t_i$ = irradiation time = 6.9 min.
$T_{1/2}$ = half life of radionuclide produced. $T_{1/2 AL} = 2.3$ minutes.

Calculation:

$$38.9 d/\text{sec.} = 1 \times 10^{13} \times 0.23 \times 10^{-24} \times N \times 1.00 \left[1 - e^{\frac{-0.693 \times 6.9}{2.3}}\right]$$

$$N = \frac{38.9}{0.23 \times 10^{-11} [1 - e^{-2.08}]} = \frac{169 \times 10^{11}}{7/8} \text{ atoms}$$

$$N = \frac{1352 \times 10^{11}}{7} = 19.3 \times 10^{12} \text{ atoms of indicator material}$$

(6) Compute weight of indicator material in sample:

Weight in grams =

$$\frac{\text{number of atoms} \times \text{mole wt. of material in grams}}{\text{number of atoms per gram mole}}$$

$$W = \frac{19.3 \times 10^{12} \text{ atoms} \times 26.99 \text{ gm./mole}}{6.02 + 10^{23} \text{ atoms/mole}}$$

$$W = \frac{520.9 \times 10^{-11}}{6.02} = 86.53 \times 10^{-11} \text{ gm.}$$

(7) Compute concentration of indicator material in sample:

$$\text{Concentration} = \frac{\text{wt. of material}}{\text{volume of sample}}$$

$$C = \frac{86.5 \times 10^{-11} \text{ gm.}}{5 \text{ cm.}^3} = 17.3 \times 10^{-11} \frac{\text{gm.}}{\text{cm.}^3}$$

(8) Compute total weight of indicator material in entire volume of oil:

Weight of material = volume of oil $\times$ concentration of material in oil.

$$W = 24 \text{ qt.} \times 946.4 \frac{\text{cm.}^3}{\text{qt.}} \times 17.3 \times 10^{-11} \frac{\text{gm.}}{\text{cm.}^3}$$

$$W = 415.2 \times 946.4 \times 10^{-11} = 3.9 \times 10^{-6} \text{ gm.}$$

(9) Compute volume of indicator material worn and transferred to oil:

$$\text{Volume} = \frac{\text{Weight of material}}{\text{Density of material}}$$

$$V = \frac{3.9 \times 10^{-6} \text{ gm.}}{2.699 \frac{\text{gm.}}{\text{cm.}^3} \times 16.39 \frac{\text{cm.}^3}{\text{in.}^3}} = \frac{1.444 \times 10^{-6}}{16.39} \text{ in.}^3$$

$$V = 8.81 \times 10^{-8} \text{ in.}^3$$

(10) Calculate average depth of wear of indicator inserts:

$$\text{Depth of wear} = \frac{\text{volume of wear}}{\text{area of wear surface}}$$

$$D = \frac{V}{A} = \frac{8.81 \times 10^{-8} \text{ in.}^3}{6 \times 0.0491 \text{ sq. in.}}$$

$$D = \frac{8.81 \times 10^{-8} \text{ in.}}{0.2946} = 0.299 \times 10^{-6} \text{ inches}$$

Therefore, depth of indicator insert wear is 0.3 microinch indicating that the average depth of bearing wear in the vicinity of the inserts is 0.3 microinch.

If desired, different indiicator materials may be used in different wearing areas of the bearing or other part such that the distribution of the wear can be determined. Thus each of the inserts 18 may be composed of different materials to provide a basis for a separate measurement of wear at the vicinity of each insert. Similarly, the bearing surface 12 of the crankshaft may contain inserts 20 of different materials than any of the inserts 18 so that simultaneous measurements can be made of the wear of the crankshaft surface 12 and the bearing liner 16. The number of regions capable of simultaneous study is limited only by the number of suitable indicator materials in which there can be induced separately identifiable radioactivity.

The advantages of the method of this invention are many. The test can be run anywhere, no special tools or radiation shielding being required at the test location. There is no requirement for special test equipment such as dry boxes, fume hoods, filter or the like normally associated with radioactive materials. The test can be used to determine wear on a single part, or various parts or surfaces simultaneously. It has a high degree of selectivity which permits wear investigation of a single part or surface of a part as opposed to conventional nonselective methods which rely on spectrographic analysis of oil contamination by gross part wear. The method is useful for wear testing various bearing surfaces such as cylinder liners, pistons, piston ring, valve stems, crankshaft bearings, push-rods, gears and the like.

While the invention has been described specifically with reference to a particular embodiment thereof, it will be understood that changes and modifications may be used, all within the full and intended scope of the claims which follow.

We claim:
1. A method of testing the wear characteristics of a surface comprising the steps of placing an insert in said surface of a material which is distinct from the material of the surface and which can be transformed by radiation to a radioisotope having separately identifiable radiation, subjecting the surface with the insert therein to wear, collecting the wear debris, irradiating the wear debris and then measuring the radioactivity of the irradiated wear debris.

2. A method of simultaneously testing the wear characteristics of each of a plurality of surfaces in a mechanical device comprising the steps of placing an insert in each of said surfaces of a material which is distinct from the material of the surfaces and which can be transformed by radiation to a radioisotope having separately identifiable radiation, each of said inserts being of a different material from that of the other inserts, subjecting the surfaces with inserts therein to wear, collecting the wear debris, irradiating the wear debris and then measuring the radioactivity of each of the radioisotopes in the irradiated wear debris.

References Cited by the Examiner

UNITED STATES PATENTS

| | | | |
|---|---|---|---|
| 2,315,845 | 8/1943 | Ferris | 250—106 |
| 2,640,936 | 6/1953 | Pajes | 250—106 |
| 2,723,351 | 11/1955 | Garrison | 250—83.3 |
| 2,744,199 | 5/1956 | Juterbock et al. | 250—106 |
| 2,751,506 | 6/1956 | Black et al. | 250—106 |
| 2,811,650 | 10/1957 | Wagner | 250—106 |
| 2,874,303 | 2/1959 | Lane | 250—106 |

OTHER REFERENCES

Second United Nations International Conference on the Peaceful Uses of Atomic Energy, vol. 19, United Nations Press, Sept. 1 to 13, 1958, pages 112 to 119.

RALPH G. NILSON, *Primary Examiner.*